United States Patent [19]
De Buyst et al.

[11] Patent Number: 6,040,527
[45] Date of Patent: Mar. 21, 2000

[54] CABLE JOINT WITH GROUNDING CONNECTION AND/OR SCREEN CROSS-BONDING FOR POWER CABLES

[75] Inventors: Jo De Buyst, Aalst; Jozef Renier Catharina Cardinaels, Wetteren, both of Belgium

[73] Assignee: Alcatel, Paris, France

[21] Appl. No.: 09/195,436

[22] Filed: Nov. 18, 1998

[30] Foreign Application Priority Data

Nov. 28, 1997 [EP] European Pat. Off. .............. 97402882

[51] Int. Cl.[7] ...................................................... H01R 4/00
[52] U.S. Cl. ........................................................ 174/88 C
[58] Field of Search .......................... 174/78, 73.1, 75 C, 174/88 C, 84 R; 439/98, 99

[56] References Cited

U.S. PATENT DOCUMENTS

| Re. 28,837 | 6/1976 | Silva .......................................... 174/78 |
| 3,363,049 | 1/1968 | Gosling et al. ......................... 174/78 X |
| 4,032,205 | 6/1977 | Taj ........................................ 174/78 X |
| 4,234,756 | 11/1980 | Jackula et al. ......................... 174/78 X |
| 4,586,970 | 5/1986 | Ishise et al. ......................... 174/73.1 X |
| 4,742,184 | 5/1988 | Courty et al. ........................... 174/73.1 |

FOREIGN PATENT DOCUMENTS

| 0 496 253 A3 | 7/1992 | European Pat. Off. . |
| 94 15 782 U1 | 3/1996 | Germany . |

OTHER PUBLICATIONS

"Cross–bonding Joint 123 kV type MP1.123–31/32", Cortallod Cossonay Cable.

D. Paulin et al, "Aspects particuliers d'une liaison en cables haute tension", Revue Generale de L'Electricite, vol. 85, No. 4, Apr. 1976, Paris, pp. 323–330.

B. Parmigiani, "Accesoires Premoules Pour Cable haute Tension a Isolant Extrude", Aug. 28, 1988, ULSI Science and Technology 1987, Philadelphia, May 11–15, 1987, NR. Symp. 1, pp. 1–8.

*Primary Examiner*—Kristine Kincaid
*Assistant Examiner*—Chau N. Nguyen
*Attorney, Agent, or Firm*—Sughrue, Mion, Zinn, Macpeak & Seas, PLLC

[57] ABSTRACT

A cable joint for inter-connecting two power cables (1, 2) in a junction body (3) which is made water impervious and is electrically shielded by a two part metallic member (14; 15, 16) that is connected to the lead sheaths or metallic screens (8, 9) of the power cables. The shielding is however interrupted by a shield break (17) located next to the junction body, and a grounding connection and/or cross-bonding cable is electrically connected to each part of the member, i.e. at both sides of the shield break. This cable may be of the 2-single-core or of the coaxial type and all the grounding earthing connections and/or cross-bonding are concentrated at one end of the cable joint. An insulated conductor (20) runs from one end to the other of the cable joint over the junction body (3) but inside the metallic member. By locating the insulated conductor between the junction body and the metallic member, the outer protection (23) of the cable joint may be applied closer to this member so that the outer diameter of this joint is reduced. Also the amount of filling material, e.g. polyester resin, the weight and the cost are thereby reduced, and the cable joint is easy to handle.

10 Claims, 4 Drawing Sheets

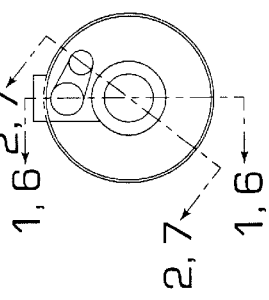
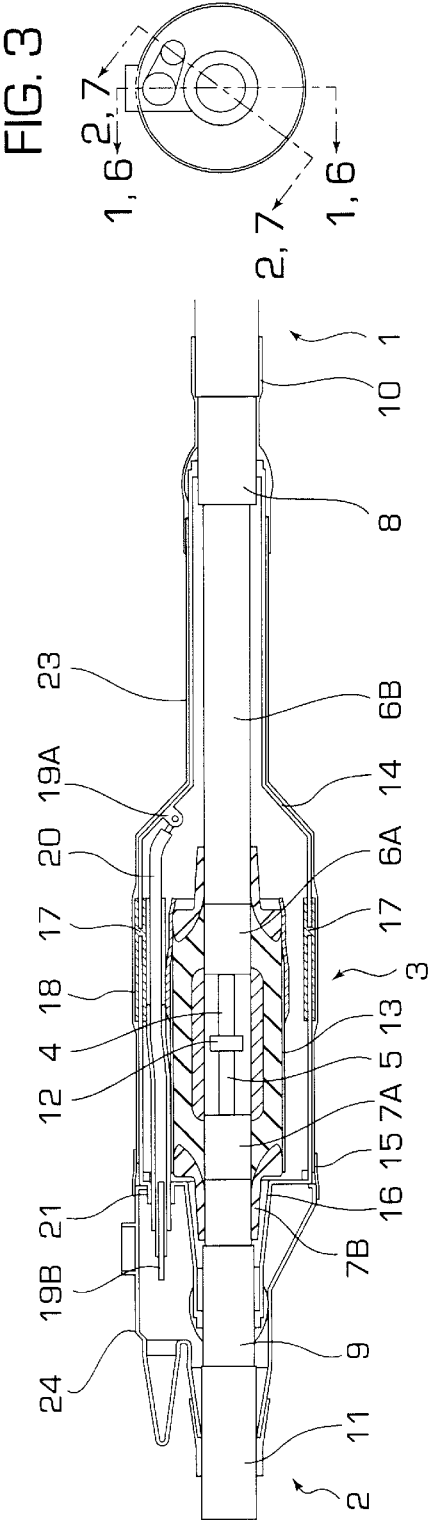
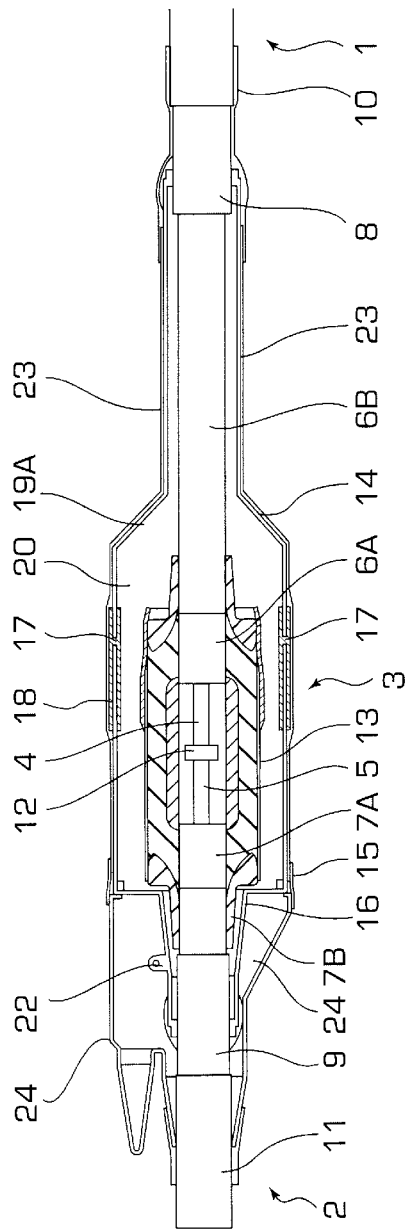

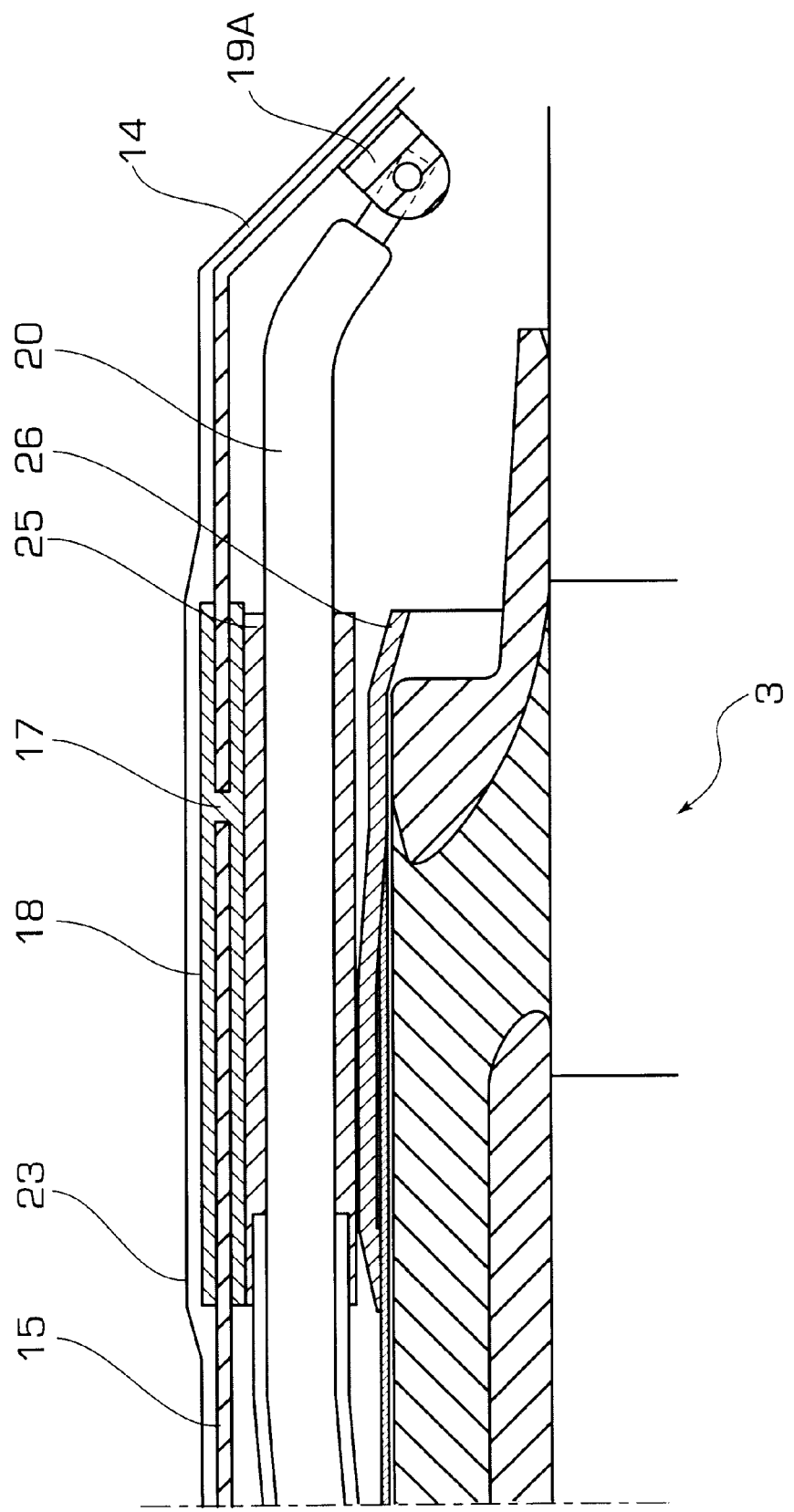

CABLE JOINT WITH GROUNDING CONNECTION AND/OR SCREEN CROSS-BONDING FOR POWER CABLES

BACKGROUND OF THE INVENTION

The present invention relates to a cable joint for connecting power cables. In a conventional cable joint for connecting power cables, each cable having a conductor successively surrounded by a first insulation layer, a semi-conductive layer, a metallic screen, and a second insulation layer, the cable joint including a junction body comprising connection means for connecting bared portions of the conductors together at the terminus of each cable and first insulation means for surrounding the connection means, the cable joint further including a metallic member forming a shield over the junction body, and second insulation means covering the metallic member as well as end portions of the second insulation layer of the power cables, the metallic member having at least two parts electrically separated by a shield break and each provided with a terminal electrically coupled to the metallic screen of a distinct one of the power cables.

In such a known cable joint, a pre-moulded junction body is surrounded by a metallic member that is a metallic tube narrowed and soldered on both ends of the joint to the metallic screens of the cables. The shield break is an interruption of this tube and comprises an insulating flange of about 300 mm in length located over the connection means. This insulating ring is bolted between the two parts of the metallic tube. The cover formed by the metallic member, with the insulating ring, is filled with glass pellets to improve heat conductivity. The terminals of the two parts of the metallic member are used for grounding connections and/or for cross-bonding the metallic screens. The reason for such connections is that, for instance, in case of three single-core power cables making up a three-phase cable installation, the currents that are induced in the metallic screens of the cables may become intolerably high. These induced currents may be eliminated by dividing the metallic screens into isolated sections that are cross-bonded. To this end, conductors interconnect the terminals of the metallic members of the different cables. The conductors are constituted by 2 single-core cables or by a coaxial cable of which at least one part runs on top of the metallic tube to access the terminal located at an end of the junction body. The connections, cables and the whole metallic member are covered by a polyester box completely filled with a polyurethane resin to provide mechanical protection and electrical insulation, this box constituting the second insulation means.

In this known type of cable joint, the amount of resin to be cost in the field between the metallic member and the second insulation means for insulating and protecting the metal cover and the conductor(s) running thereon is relatively important. The cable joint is thereby relatively expensive, its weight is high and it has a large external diameter.

Another type of known cable joint is for instance the "Cross-bonding joint 123 kV" type: MP1.123-31/32 of "CORTAILLOD COSSONAY CABLE". In this other known cable joint, a pre-insulated metallic tube is used for covering the whole junction body. At one end of the cable joint, the tube is soldered to the metallic screen of the cable, whilst at the other end of the cable joint, a relatively big epoxy insulator surrounds the other cable and is partially engaged into the metallic tube. This epoxy insulator has embedded two conductors electrically separated from each other and connected to terminals. One terminal is electrically connected to the metallic tube, whilst the other terminal is soldered to the metallic screen of the other cable. The embedded conductors extend out from the epoxy insulator, diametrically opposed, at the same end of the cable joint where grounding connection and/or cross-bonding is then possible. Because of the pre-insulated metallic tube, constituting the metallic member together with the second insulation means, no polyurethane resin is needed. However, the weight of the casing and the epoxy insulator is high. As a consequence, it is relatively difficult to handle the parts of this cable joint. Moreover, grounding connection and/or cross-bonding can not be done by means of a coaxial cable because the terminals, and thereby also the conductors, are diametrically separated in the epoxy insulator. This known cable joint is further relatively expensive because of the materials used therein.

It is further to be noted that in this known implementation, no filling material, such as glass pellets, is used between the metallic tube and the power cable. The thermal conductivity of the cover is thus bad because of the air gap created between the junction body and the metallic tube.

SUMMARY OF THE INVENTION

An object of the present invention is to provide a cable joint of the above known type but wherein the conductor(s) may either be of the single core type or of the coaxial type, and wherein the weight and the outer diameter are reduced, so that it will be easy to handle and relatively cheap. The cable joint should also have a good thermal conductivity.

According to the invention, this object is achieved due to the fact that at least one of the terminals is an internal terminal located at the inner side of the metallic member and is connected to one end of an insulated conductor located inside the metallic member and of which the other end extends outside the metallic member.

By placing the insulated conductor—used, as mentioned above, for grounding connections and/or cross-bonding of the metallic screens—between the first insulation means of the cable joint and the metallic member, the outer diameter of the cable joint is reduced. Indeed, since the insulated conductor is no longer located between the metallic member and the second insulation means, the latter, i.e. the outer protection, may be applied closer to this metallic member. As a result, the overall volume of the cable joint is reduced as well as the amount of filling material, e.g. polyester resin, used. Also the weight and the cost of the cable joint are thereby decreased, and the latter is easy to handle. Owing to the reduced amount of filling material, a good thermal conductivity is provided.

Another characteristic feature of the present invention is that the metallic member has the shape of a tube having a cylindrical part narrowed at each end of the junction body, the shield break being provided in the cylindrical part, and that the internal terminal is connected to a first part of said metallic member and is located between a first narrowed end of the tube and a corresponding first end of the junction body.

By making the metallic member, that has substantially the same shape as the junction body, slightly longer than this junction body, a free volume can be created between the latter and the first end of the member. This free volume is used to locate the internal terminal, whereby the access thereto is facilitated. Moreover, the overall volume of the cable joint remains relatively small, as well as the weight thereof.

Also another characteristic feature of the present invention is that the terminal connected to the second part of the metallic member is an external terminal located at the second narrowed end of the tube, that the first and second parts of the metallic member form together a watertight box surrounding the junction body, and that the other end of the insulated conductor extends through an opening provided in the second part of the member, near to the external terminal.

In this way, the two parts of the metallic member form a water impervious shield at the outside of which the two terminals are electrically accessible. Furthermore, since the insulated conductor exits the shield near to the external terminal, the accesses to the two terminals are concentrated at one end of the cable joint. As a result, the grounding or cross-bonding cable used may be of the coaxial type.

The present invention is also characterized in that the second part of the metallic member comprises the second narrowed end and a portion of the cylindrical part of the tube between the second narrowed end and the shield break, and in that the second narrowed end has the external terminal and the opening.

Furthermore, the portion of the cylindrical part of the tube and belonging to the second part of the metallic member, the shield break and the first part of the metallic member including the remaining cylindrical part of the tube and the first narrowed end are rigidly assembled, and the second narrowed end is mechanically tightened to this rigid assembly.

The assembly of the cable joint in the field is thereby facilitated since it merely consists in fixing the second narrowed end of the metallic member to the rigid assembly.

Also another characteristic feature of the present invention is that a pre-fabricated insulator is provided at the shield break, and in that the facing ends of the two cylindrical parts of the tube are mechanically tightened to the insulator.

In the known prior art, the moisture barrier is interrupted over the shield break by means of an insulating ring that is relatively long (about 300 mm as mentioned above). This creates a relatively large gap of non-metallic material that is not totally impervious. By using a pre-fabricated insulator as indicated, the length of the interruption of the moisture barrier may be dramatically reduced, e.g. to less than 10 mm.

In can also be proved that the mechanical rigidity of the metallic member, and thus also of the whole cable joint, may be increased by positioning the shield break near to one of the ends of the junction body.

The present invention is further also characterized in that a layer of material having a relatively high dielectric constant surrounds the insulated conductor in the area of the shield break.

This provides a good electrical stress control.

Practically, the watertight box of the present cable joint is filled with glass pellets, and the second insulation means includes a polyester box filled with resin.

The thermal conductivity of the complete cable joint is thereby improved.

Further characteristic features of the present invention are mentioned in the appended claims.

BRIEF DESCRIPTION OF THE DRAWINGS

The above and other objects and features of the invention will become more apparent and the invention itself will be best understood by referring to the following description of an embodiment taken in conjoint with the accompanying drawings wherein:

FIG. 1 is a longitudinal section view of a cable joint according to the invention;

FIG. 2 is the same longitudinal section view of the cable joint of FIG. 1 but rotated by an angle of 45°;

FIG. 3 is a transversal view of the cable joint indicating the axis of the sections shown in FIGS. 1 and 2;

FIG. 4 is a detail view of the upper top portion of FIG. 1; and

DETAILED DESCRIPTION OF THE PREFERRED EMBODIMENTS

Figure 5:
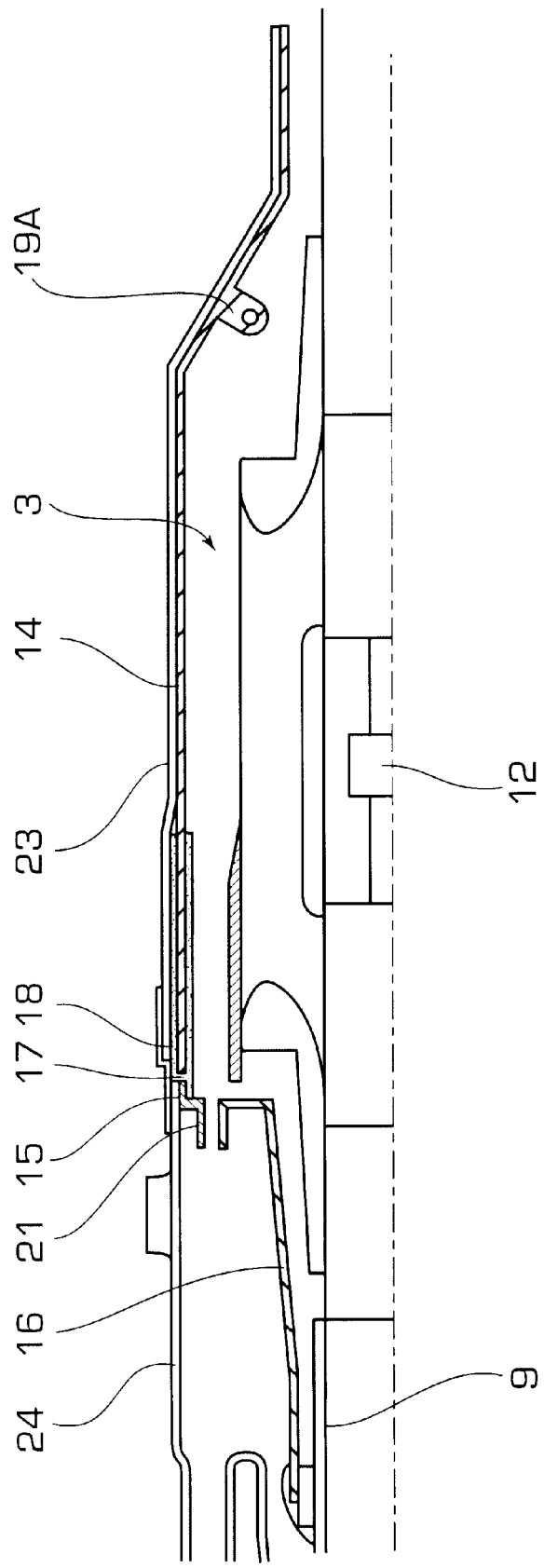
FIG. 5 is a detail view of a variant implementation of the cable joint of FIG. 1.

The longitudinal section of a cable joint linking two high voltage or power cables, generally indicated by the referrals 1 and 2, is shown in FIGS. 1 and 2. FIG. 1 represents a cable joint section along an axis A as indicated in FIG. 3, that is a transverse view of this cable joint, whilst FIG. 2 represents a similar cable joint section but along an axis B, also indicated in FIG. 3. The cable joint includes a junction body 3 wherein the terminus of the bared conductors 4 and 5 of the two single core high voltage cables 1 and 2 respectively are electrically connected to each other and re-insulated. Each of these power cables 1/2 comprises a conductor 4/5 surrounded by a first insulation layer 6A/7A that is itself coated by a semi-conductive layer 6B/7B and surrounded by a metallic screen, e.g. a lead sheath, 8/9. The whole is surrounded by an outer PVC sheath or second insulation layer 10/11. The junction body 3 comprises a connection part 12 adapted to electrically interconnect the conductors 4 and 5 of the cables and an insulation box 13 covering the connection part 12, the first insulation layers 6A, 7A and portions of the semi-conductive layers 6B, 7B of these cables. Such a junction body 3 as well as the power cables 1 and 2 are all well known in the art and need thus not to be described in more detail hereafter.

The metallic screen 8/9 of a power cable 1/2 is a water impervious layer that has to be continued along the joint. The cable joint is also used to ground the metallic screens of the power cables or to make cross-bonding on the metallic screens 8 and 9. Cross-bonding means that, when for instance three single core power cables making up a three-phase cable installation are further connected to three other cables via three distinct cable joints, the metallic screens of these cables are cross-interconnected. The metallic layer is then interrupted and connected externally from the cable joints. In more detail, in a three phase installation, the metallic screen of an incoming cable of phase [a] (not shown) is then for instance connected to the metallic screen of an outgoing cable of phase [b], the metallic screen of an incoming cable of phase [b] is connected to the metallic screen of an outgoing cable of phase [c], and the metallic screen of an incoming cable of phase [c] is connected to the metallic screen of an outgoing cable of phase [a].

To this end, at both ends of the junction body 3, the metallic screens 8 and 9 of the power cables 1 and 2 are bared over a predetermined length and each soldered over their whole circumference to a distinct end of a metallic member having the shape of a tube. This metallic tube has a central cylindrical part surrounding the junction body and narrowed ends. It is a watertight box that forms a shield protecting the junction body 3. The metallic tube has two-parts electrically separated by a shield break 17, this shield break being preferably located in the cylindrical part of the tube. A first part 14 of the tube, shown on the right in the FIGS. 1 and 2, is constituted by a right portion of the cylindrical part and by the right narrowed end of the tube. It covers the right end of the junction body 3 as well as the end of the cable 1 until the soldering with the metallic screen 8. The diameter of this first part 14 is relatively large over the junction body 3 and is narrowed over the cable 1 since the outer diameter of this cable is smaller than that of the junction body. The second part 15, 16 of the metallic member or tube is constituted by the remaining left portion 15 of the shielding metallic cylindrical part of the tube covering the left of the junction body 3, and by a narrowed end 16 covering the end of the cable 2 at the left of the junction body 3 until the soldering with the metallic screen 9. The assembly of the present metallic member consists in mechanically tightening the narrowed end 16 to the portion 15 of the cylindrical part over the whole length of its circumference. This assembly provides also a good electrical contact between the end 16 and the portion 15 of the tube.

It is to be noted that, as will be described hereafter, the left portion 15 of the cylindrical part, the shield break 17 and the first part 14 of the metallic member or tube are rigidly assembled prior to being used in the field.

As already mentioned, the left portion 15 of the cylindrical part of the shield faces the right portion of this cylindrical part but is insulated therefrom by shield break 17. In more detail, the two cylindrical portions 15 and 14 are maintained in place, mechanically tightened and protected by a pre-fabricated insulator 18 including the shield break 17. The right upper part of the cable joint and thus also the insulator 18 are visible in more detail on FIG. 4. The insulator 18 has the form of a ring with a lying-H shaped longitudinal cross-section in which branches are engaged, with a tight fit, the ends of the portions 15 and 14. Owing to the use of this pre-fabricated insulator 18 and of its position, the interruption of the metallic screen caused by the shield break 17 in the cylindrical part thereof, is minimized to a length of less than 10 mm.

The inner side of the first part 14 of the metallic shielding member is provided with an internal terminal 19A to which an insulated conductor 20 is connected. For reducing the overall volume of the shielding member, the internal terminal 19A is preferably located on the inner surface of the first narrowed end 14 of the tube, in the volume available between the right end of the junction body 3 and the right narrowing part of the tube. The insulated conductor 20 is used for the above mentioned grounding or cross-bonding connections. It has a first end 20A which connects to the internal terminal 19A, runs between the junction body 3 and the cylindrical part, and exits the watertight metallic member via an opening 21 in the narrowed end 16 of the tube where the second end 19B of the insulated conductor is accessible, as shown in FIG. 1. This second end 19B is thus electrically in contact with the metallic screen 8 of the power cable 1 via the insulated conductor 20, the internal terminal 19A and the first part 14 tubular shield. The narrowed end 16 of the second part of the tubular shield is provided with an external terminal 22, visible in FIG. 2. This external terminal 22 is thus in electrical contact with the metallic screen 9 of the power cable 2 via the second part 16 of the metallic member.

Although two distinct cables, connected to the accessible second end 19B (which provides access to the internal terminal 19A) of the insulated conductor 20 and to the external terminal 22, may be used to perform cross-bonding, a coaxial cable is generally preferred. This is possible because the two accessible shield connections 19B and 22 are concentrated at one end of the cable joint. The central conductor of the coaxial cable is then connected to the second end 19B, whilst the screening of the coaxial cable is connected to the terminal 22.

The watertight metallic member 14, 15 and 16 is made of conductive material and is filled with glass pellets. It is further fully covered by an insulation coating 23 ending, at the left side of the member, with a small polyester box 24 filled with resin. The box 24 more particularly covers the second narrowed end 16 of the tube and partially the second portion 15 of the cylindrical part. It also covers the insulated conductor 20 at the outside of the metallic member.

As shown on FIG. 4, and in order to provide a good electrical stress control, a layer 25 of material with a high dielectric constant is put around the insulated conductor 20, especially on the portion of the insulated conductor that passes along the shield break 17. On this portion also an additional insulation sleeve 26 is preferably provided around the junction body 3.

In the above embodiment, the shield break 17 is located at the right side of the cable joint 3, out of the area of the connection part 12. This means that the main part of the junction body 3 is covered by the second portion 15 of the cylindrical part of the metallic member. In an alternate embodiment, as shown on FIG. 5, the shield break 17 is located at the other side, i.e. at the very left side, of the cable joint 3. The length of the second portion 15 of the cylindrical part of the shield is then reduced to zero, whilst the first portion of the cylindrical part covers the main part of the junction body 3. Such a structure is generally more rigid than the previous one.

Figure 6:
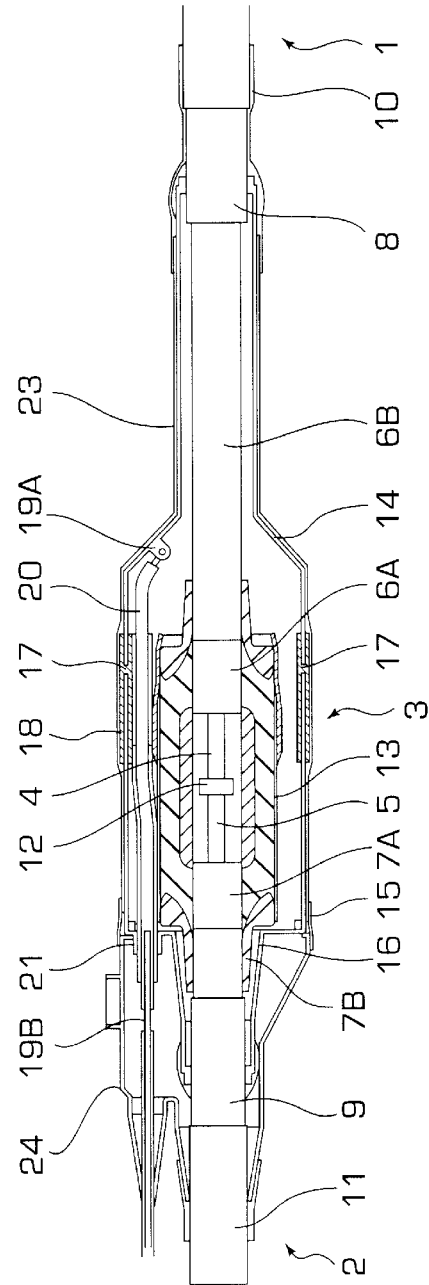
Figure 7:
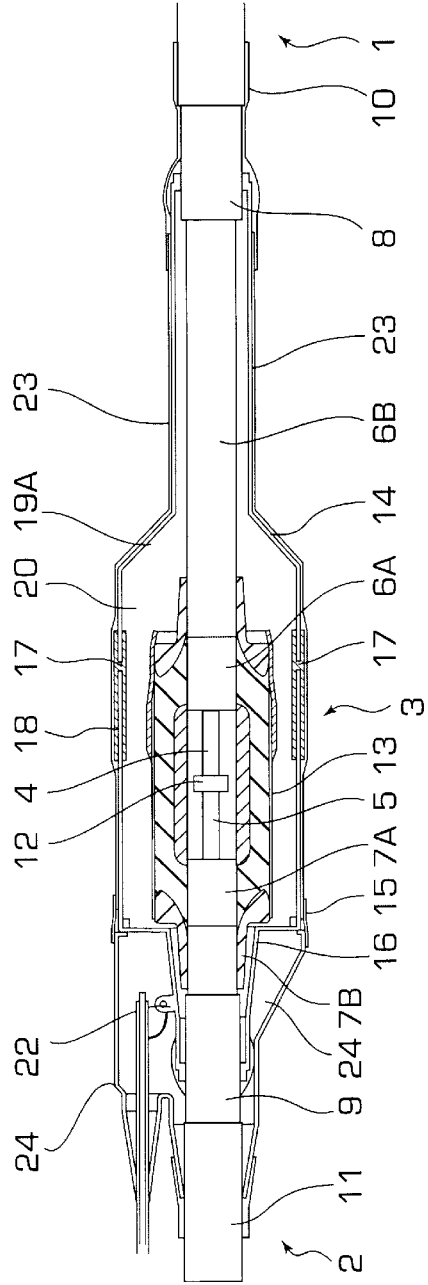

FIG. 6 shows a coaxial cable as well as the connection of the central conductor, and of the screening thereof (at FIG.7).

While the principles of the invention have been described above in connection with specific apparatus, it is to be clearly understood that this description is made only by way of example and not as a limitation on the scope of the invention, as defined in the appended claims.

What is claimed is:

1. A cable joint for connecting power cables, each cable having a terminus and having a conductor having bared portions successively surrounded by a first insulation layer, a semi-conductive layer, a metallic screen, and a second insulation layer, said cable joint including a junction body having a first end and a second end, said junction body comprising:
connection means for connecting said bared portions of the conductors together at the terminus of each cable and first insulation means for surrounding said connection means, said cable joint further including:
a metallic member having an inner and an outer side forming a shield over the junction body, and second insulation means covering said metallic member as well as end portions of the second insulation layer of the power cables,
said metallic member having at least two parts electrically separated by a shield break and each of the parts provided with a terminal electrically coupled to the metallic screen of each of said power cables,
wherein at least one of said terminals is an internal terminal located at the inner side of said metallic member and is connected to a first end of an insulated conductor located inside said metallic member and having a second end of the insulated conductor which extends outside said metallic member.

2. The cable joint according to claim 1, wherein said metallic member has a shape of a tube having a cylindrical part narrowed at said first and said second end of the junction body, said shield break being provided in said cylindrical part, and wherein said internal terminal is connected to a first part of said metallic member and is located between a first narrowed end of said tube and the first end of the junction body.

3. The cable joint according to claim 2, wherein one of said terminals is an external terminal connected to a second part of the two parts of the metallic member, said external terminal being located at a second narrowed end of said tube, and wherein said first and second parts of said metallic member form together a watertight box surrounding said junction body, and wherein said other end of the insulated conductor extends through an opening provided in the second part of said member, near to the external terminal.

4. The cable joint according to claim 3, wherein said second part of the metallic member comprises said second narrowed end and a portion of the cylindrical part of said tube, wherein the portion is between said second narrowed end and said shield break, and wherein said second narrowed end has said external terminal and said opening.

5. The cable joint according to claim 4, wherein a rigid assembly is formed including said portion of the cylindrical part of said tube of said second part of the metallic member, and said shield break, and the first part of said metallic member which includes both a remaining portion of the cylindrical part of said tube and said first narrowed end, and wherein said second narrowed end is mechanically tightened to said rigid assembly.

6. The cable joint according to claim 5, wherein said cable joint further includes a pre-fabricated insulator at the location of said shield break, and wherein the portion of the cylindrical part of the tube and the first part of the metallic member each has ends which face one another and said facing ends are mechanically tightened to said insulator.

7. The cable joint according to claim 1, wherein a layer of material having a relatively high dielectric constant surrounds said insulated conductor in an area of said shield break.

8. The cable joint according to claim 3, wherein said second end of the insulated conductor is connected to a central conductor of a coaxial cable of which a screen is connected to said external terminal, the coaxial cable being used one of grounding and for cross-bonding connections.

9. The cable joint according to claim 3, wherein said watertight box is filled with glass pellets.

10. The cable joint according to claim 3, wherein said second insulation means includes a polyester box filled with resin.

* * * * *